United States Patent Office 3,518,174
Patented June 30, 1970

3,518,174
METHOD AND APPARATUS FOR PURIFICATION OF WATER CONTAINING ORGANIC CONTAMINANTS
Kiyoshi Inoue, 182 3-chome, Tamagawayoga-machi, Setagaya-ku, Tokyo, Japan
Continuation of application Ser. No. 317,841, Oct. 21, 1963. This application Aug. 10, 1967, Ser. No. 659,813
Int. Cl. C02b 1/82
U.S. Cl. 204—149
6 Claims

ABSTRACT OF THE DISCLOSURE

Method and apparatus for the elimination of organic contaminants from water whereby a normally water-insoluble fluoride compound is introduced into and maintained in direct contact with the water at a cathodic region thereof, while a direct electric current is passed directly through the water to release fluoride ion from this normally insoluble compound and electrically promote the interaction of the fluoride ion with the organic contaminants. A high-frequency alternating current may be superimposed upon the direct current while the mass of insoluble fluoride can encase the cathode in a porous mass. The electrodes may be disposed upon a floating vessel which simultaneously carries the current source into insoluble fluoride.

This application is a continuation of application Ser. No. 317,841, filed Oct. 21, 1963, now abandoned.

My present invention relates to the purification of water containing organic contaminants and, more particularly, to a improved method of water purification and apparatus for carrying out such treatment.

There have been many proposals heretofore relating to the treatment of water-supply systems, waste water including industrial effluence and sewage (treated or untreated), and water containing dissolved or suspended organic matter. For example, it is a conventional practice in the art of water treatment to aerate water of a supply system in an effort to cause oxidation and biodegration of undesirable constituents and to aerate sewage effluents in an effort to promote bacterial and chemical decomposition of organic matter in a suspended or dissolved state. Additionally, chlorine and other bactericides have been added to water to eliminate pathogenic microorganisms therein while water has been subjected to treatment with ion-exchange agents to decrease its hardness by removal of metal ions from the water. Furthermore, detergents and surface-active agents have been added to water in order to enable the latter to pick up normally insoluble organic materials, e.g. in the washing of garments, dishes or utensils. In most cases, previous treatment methods could not ensure a substantial reduction in the content of organic and inorganic substances in water to be treated unless considerable time was available for the promotion of biochemical action through the use of activated sludges, enzymes and bacteria. The use of gaseous chlorine or hypochlorites and similar additives heretofore served primarily to reduce the concentration of living micro-organisms and did little to eliminate their presence as BOD (biochemical oxygen demand) and COD (chemical oxygen demand) solids. The addition of chlorine to water supplies containing putrefaction elements and releasing ammonia and hydrogen sulfide upon boiling did little to reduce the concentrations of these constituents.

It is the principal object of the present invention, therefore, to provide an improved method of treating water containing organic contaminants whereby the aforementioned disadvantages can be eliminated.

A further object of this invention is to provide a method of and an apparatus for the high-rate treatment of water in such manner as to reduce its COD solids concentration and hardness.

Yet another object of this invention is to provide a plant for the automatic continuous treatment of water in a supply system.

Still another object of this invention is to provide a method of a means for the treatment of substantially static bodies of water as indicated above.

A further object of the instant invention is to provide a method of treating water sustaining living organisms whereby deterioration of the latter can be reduced.

Another specific object of my present invention is to provide an improved method of washing articles in water and treating water so employed so as to reduce the concentration of organic constituents therein.

I have discovered that the organic content of water can be sharply reduced by treating the water with a substance adapted to release fluoride ions therein and then subjecting the water containing fluoride ions to the action of a unidirectional (direct) electric current. The use of the direct current in the absence of fluoride ion fails to reduce the organic content of a body of water while the mere introduction of fluoride ion likewise has little effect. While the precise mechanism for the results obtained by this system is not fully clear at present, it appears that the use of a direct current in combination with fluoride ion promotes the attack of the latter upon amino acids and like substances present in water containing organic material derived from living organisms. It has been found that a large proportion of organic contaminants of the usual water-supply systems and almost all sewage effluents are proteinaceous materials containing amino acids or readily hydrolized into the latter merely by their presence in the water. Amino acids of this type are generally represented as the zwitterion

In acid solution, the zwitterion may be present as

having picked up a hydrogen ion from solution. In basic solutions, the species

is believed to be present, the amino group having released a hydrogen ion to the solution for combination with a hydroxyl ion. In neutral solutions (pH=7), the following equilibrium may be hypothesized:

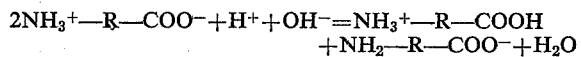

the various amino acid species having relatively short lives. In any event, a substantial number of amino-acid molecules may be considered to be present as species having net positive or negative charges. When a direct current is passed through a body of water containing proteinaceous material and, consequently, amino acids as indicated above, the charged species apparently are drawn toward the electrodes of opposite polarity. Consequently, at the positive electrode, the negatively charged amino acid species are concentrated at a region in which the concentration of fluoride ion is high as a consequence of the negative charge of the fluoride ion. There seems to ensue some form of reaction between fluoride ion and the amino acids by means of which proteinaceous material is precipitated from solution or, at least, rendered highly insoluble and removable by filtration. At the negative electrode, at which the fluoride ion is released into solution according to a more specific feature of this invention, positively charged amino acid species are present, the latter apparently combining with the fluoride ion in the manner of salt-forming reactions. Analysis of the precipitated material has shown the presence of some originally bound fluorine, indicating that the fluorine may have replaced either the amino group or the carboxyl group, and some ionic fluorine which presumably is present in ionic bonds with a portion of the amino-acid molecule of opposite charge.

Best results are obtained when the high-frequency alternating current (whose frequency ranges from 1 kilocycle to 1 megacycle per second) is superimposed upon the direct current. This alternating current apparently reduces the work function at the electrode surfaces and promotes electron transfer therealong in order to increase the rate at which fluoride ion is released into solution and the rate at which electrons are removed from a reaction product to enable the latter to achieve a stable state. Ion-to-electron transfer at an electrode surface is apparently dependent upon the work function of the surface, this work function being proportional to the polarity or voltage gradient across the surface. When polarity reverses, the work function reverses in terms of its characteristic potential. The superimposition of high-frequency alternating current upon the direct current appears to cause rapid fluctuation in the polarity applied to electrode surfaces so that the work function then assumes a lower value intermediate its peak values.

According to a further feature of this invention, the negative electrode of the system is provided with a supply of a fluorine-containing compound which releases fluorine ion into solution. Thus this negative electrode can be surrounded by a porous bag containing a comminuted fluoride salt or encased within a porous mass of this salt, forming a pellet or disk of the active material.

The above and other objects, features and advantages of the present invention will be more readily apparent from the following description, reference being made to the accompanying drawing in which.

Figure 1:
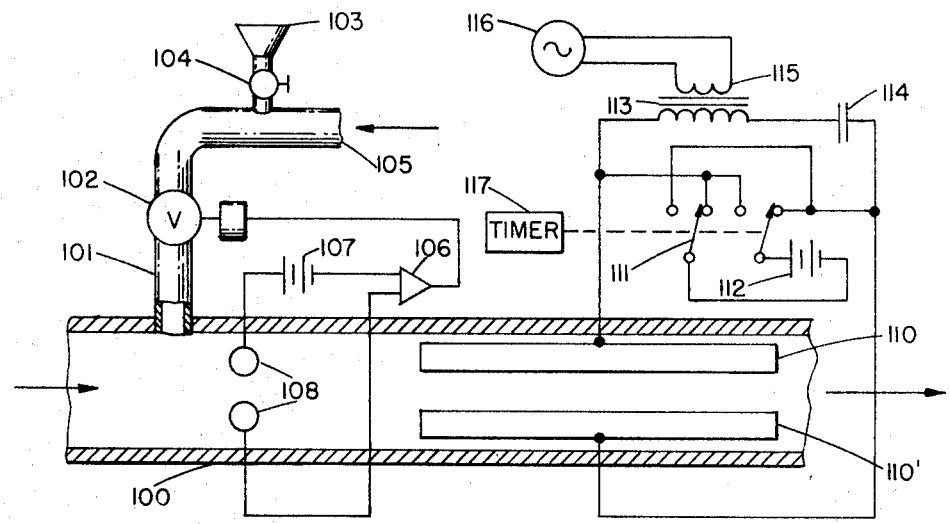
FIG. 1 is an axial cross-sectional view through a water-supply conduit provided with means for treating water according to the present invention.

In FIG. 1, I show a water-supply conduit 100 provided with an inlet pipe 101 for a stream of liquid containing fluoride ion or a salt adapted to release fluoride ion. Pipe 101 has an electromagnetically controlled valve 102, interposed between its inlet 105 and the conduit 100, through which a secondary stream of water entraining the fluoride ion therewith is pumped into the main supply line 100. A hopper 103 releases a fluorine-containing salt into pipe 101 at a rate controlled by valve 104. A pair of juxtaposed platinum disks 108 form a conductivity cell in series with the battery 107 and amplifier 106 whose output operates valve 102. When conductivity cell 108 senses a reduction in the conductivity of the water passage through pipe 100, valve 102 is operated to increase the flow of liquid from pipe 101 into conduit 100 and thus to entrain a greater portion of the fluoride salt into the water. The salt which can be aluminum fluoride, calcium fluoride, sodium fluoride or sodium fluosilicate readily dissociates in conduit 100 and passes with the water flowing therethrough between a pair of electrodes 110, 110'. A battery 112 is connectable by a double-pole, double-throw switch 111 to the electrodes 110, 110' with reversible polarity determined by timer 117. Such polarity reversal prevents scaling of the electrodes or polarization thereof in such manner as to increase the resistance to current flow between the electrodes. An interelectrode distance of about 10 cms. is suitable. I also provide a source 116 of high-frequency alternating current which feeds the primary winding of the transformer 113 connected in series with a direct-current blocking condenser 114 across the electrodes. Thus high-frequency alternating current is superimposed upon the direct current for the purposes previously mentioned.

Figure 2:
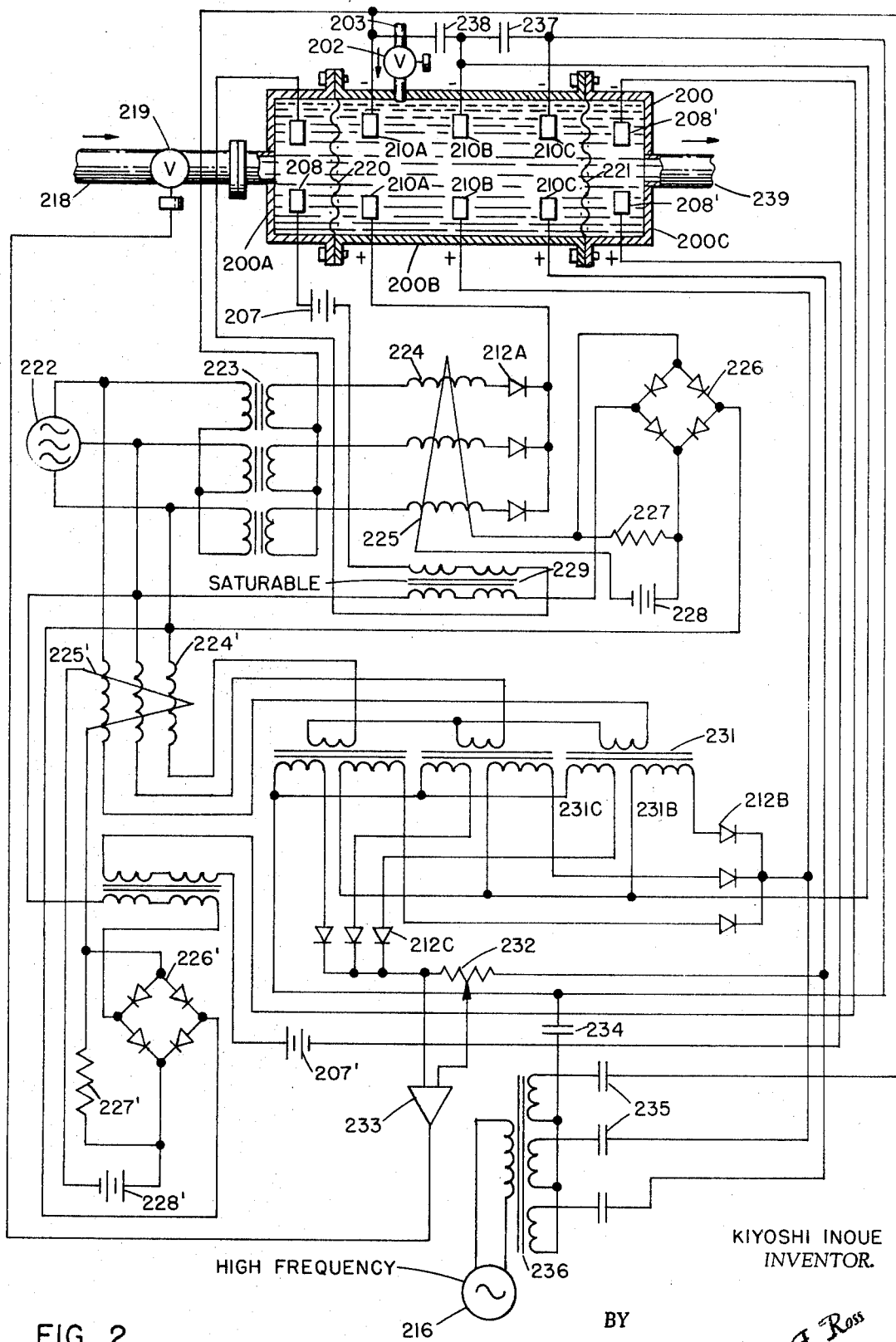
FIG. 2 is an axial cross-sectional view through the treatment chamber of a water-treatment plant illustrating the means for operating the same automatically.

The apparatus of FIG. 2 is generally similar to that of FIG. 1 although control means are provided for automatic operation of this water-purification plant. In the latter, an inlet conduit 218 supplies the treatment chamber 200 via an electrically controlled valve 219. Chamber 200 is composed of three compartments 200a, 200b and 200c flanged together and separated by screens 220 and 221. A pair of electrodes 208 form a conductivity cell rearwardly of screen 220 in compartment 200a, this cell being connected in series with a battery 207 and the control winding of a saturable-core reactor 229. Three sets of electrolysis electrodes 210a, 210b and 210c are spaced along compartment 200b in the direction of liquid flow and are maintained at successively lower potentials for the treatment of the water. The use of separate sets of electrodes not only increases the duration of treatment but takes into consideration the fact that the concentration of removable organic materials is less at each downstream set of electrodes than it was at the next upstream set. A saving in power can, therefore, be realized. Electrodes 210a are energized via a bank of rectifiers 212a, each connected in series with a respective winding of a three-phase saturable reactor 225 and the respective secondary winding of a power transformer 223 energized by three-phase alternating current source 222. The control winding 225 of saturable reactor 224 is energized with a current dependent upon the conductivity of the liquid sensed by cell 208 via a rectifier bridge 226 while a battery 228 and a resistor 227 provide the necessary bias, the magnitude of which fluctuates in accordance with the output of bridge 226. The latter has its input terminals connected in series with the power winding of saturable reactor 229 across the AC source 227.

Electrodes 210b are energized by a rectifier bank 212b, the individual rectifiers of which are supplied with power by the high-voltage secondary windings 231b of a power and isolation transformer 231. The primary windings of the latter are connected in series with respective windings of a saturable coreactor 224' across the source 222. The control winding 225' of reactor 224' is biased by a battery 228' and a resistor 227' and is connected across the output terminals of a rectifier bridge 226' whose input terminals are in series with the power winding of a saturable transformer 229'. The control windings of this transformer are connected in series with a battery 207' and a conductivity cell 208' in compartment 200c of the treatment chamber 200. Conductivity cell 208' senses residual contamination and controls the power supplied to the electrodes 210b, 210c accordingly, via reactor 229', rectifier bridge 226' and control winding 225', to increase the DC current and cause further removal of the contaminants. The electrodes 210c are supplied by another rectifier bank 212c whose low-voltage secondary windings constitute part of the aforementioned transformer 231. A resistor 232 in series with the rectifier bank 212c has a tap across which a potential appears which is proportional to the voltage supply at the last set of electrodes 210c. The tapped voltage is supplied to an amplifier 233 by means of which valve 219 is regulated to control the flow of liquid through chamber 200 so as to maintain the voltage at electrodes 210c substantially constant. If excessive contamination is present and such contamination has not been removed in the duration of the passage of the liquid past the three sets of electrodes, the resistance at electrodes 210c will deviate from a predetermined level and a correspondingly altered voltage will be sensed by amplifier 233. Valve 219 will then be opened or closed to increase or decrease the liquid rate of flow and thus the throughout of chamber 200.

A high-frequency source 216 is connected across the primary winding of a transformer 236 whose secondary windings are connected in series with respective direct-current blocking condensers 234, 235 across the electrodes 210a–210c, additional DC blocking condensers 237, 238 interconnecting the electrodes. The blocking condensers pass the high-frequency alternating current which is thus superimposed upon the direct current of rectifier banks 212a–212c while preventing short-circuiting between electrodes. The effluent exits from chamber 200 via conduit 239. A supply line 203 having a valve 202 serves to introduce the fluorine compound, containing ionizable fluoride, into chamber 200. It should be noted that chlorine-containing compounds such as barium chloride also are suitable although to a lesser degree.

Figure 3:
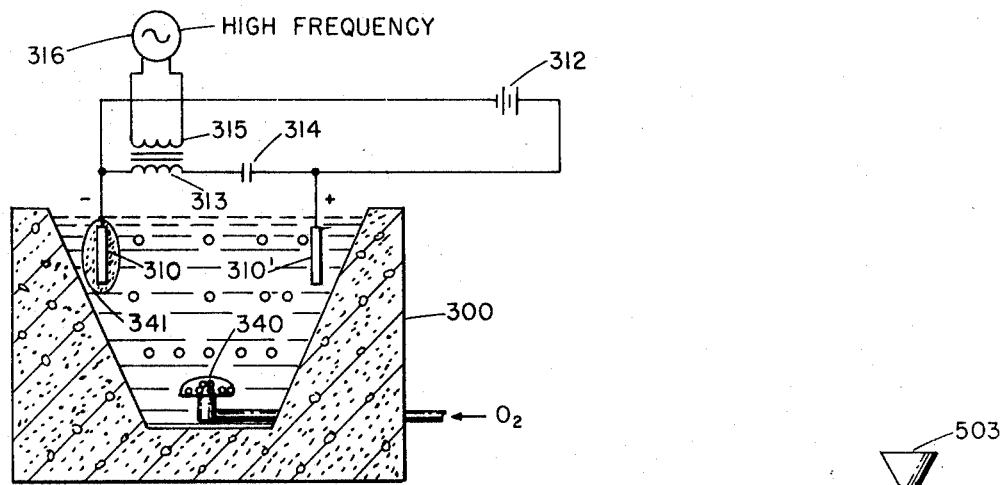
FIG. 3 is a transverse cross-sectional view through a trough of a sewage-treatment plant, according to the invention.

In FIG. 3 I show a portion of a sewage treatment plant in which the liquid vessel is a trough 300 through which the contaminated liquid passes. Oxygen is supplied to the sewage at the base of this trough via a perforated head 340 while at least partial removal of proteinaceous material is effected by electrodes 310, 310'. The cathode 310 is surrounded with a permeable bag 341 containing a compound such as sodium fluoride and is juxtaposed with a counterelectrode which like the electrodes previously described may be composed of molybdenum or a molybdenum alloy since these materials have a relatively low work function. In general, it may be mentioned that manganese, molybdenum and tin in the pure state or as alloys form the most suitable electrode materials with silicon, iron and aluminum of somewhat lesser effectiveness although of greater suitability than most other metals. In addition to the fluorine containing compounds mentioned above, fluoaluminates and fluotitanates (e.g. potassium fluotitanate and sodium fluoaluminate) are suitable, together with magnesium fluoride.

By concentrating the fluoride, say calcium fluoride, at the cathode 310 I ensure that the unidirectional current will facilitate the dissociation of the compound into ions and the presence of sufficient numbers of fluoride ions at the electrode to react with the organic matter. It may be noted at this point that the fluoride ion may be activated by electrolysis and actually produce a reactive agent which is in a different oxidation state (e.g. as an oxyfluoride ion) upon reaction with the organic matter. Such a mechanism has not been ruled out but has by no means been verified. A battery 312 is connected across the electrodes 310, 310' in parallel with the secondary winding 313 and a DC blocking condenser 314 which supply the high-frequency alternating current to be superimposed upon the direct current. The AC source 316 is connected across the primary winding 315 of the transformer. The system illustrated in FIG. 3 is equally applicable for the treatment of static bodies of water (such as swimming pools, irrigation ponds and public baths,) in which case the electrodes may be closely juxtaposed and connected in parallel with other electrodes spaced around the container or constituted as electrodes with large surface areas on opposite sides of the container.

Figure 4:
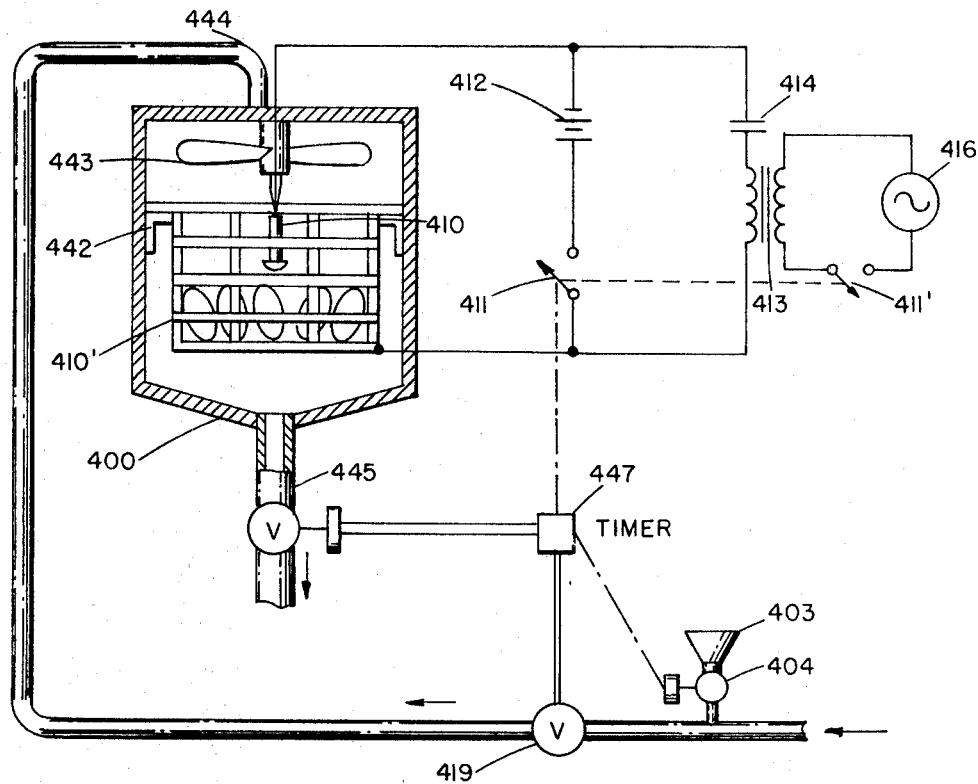
FIG. 4 is an axial cross-sectional view through a front-loading dish-washing machine embodying the instant techniques, the machine being shown diagrammatically.

FIG. 4 shows, in somewhat diagrammatic form, a front-loading dishwasher 400 adapted to receive a wire rack 410' upon insulating blocks 442. A high-pressure stream of water is directed upon the soiled articles within the basket from a whirling blade 443 to which the hot water is fed by tube 444. During operation of the washing cycle at a time determined by timer 447, the valve 446 of outlet pipe 445 is closed and a valve 404, communicating with the fluoride-supply hopper 403, is opened. Valve 419 likewise opens so that the machine 400 fills with fluoride-containing water above the level of an electrode 410 depending from the roof of the machine into the basket 410' which constitutes the counterelectrode. Timer 447 then closes switches 411 and 411' to connect a battery 412 across the electrodes in parallel with the high-frequency energizing means, namely a transformer 413 and a DC blocking condenser 414. Generator or oscillator 416 supplies alternating current to the transformer 413. It will be evident that this system facilitates removal of organic matter from solution and results in sedimentation of the contaminants from the water, the latter being able, therefore, to remove additional quantities of soil from the articles within the basket. This procedure can be repeated if desired. With the instant system it is possible to reduce the quantities of detergent which otherwise would be necessary and, to some extent, remove a portion of the detergent from the water. The grid and other sedimented contaminants can be collected upon conventional traps or filters. Electrodes 410 can be provided with a supply of sodium fluoride etc. in the manner of electrode 310 of FIG. 3 if desired.

Figure 5:
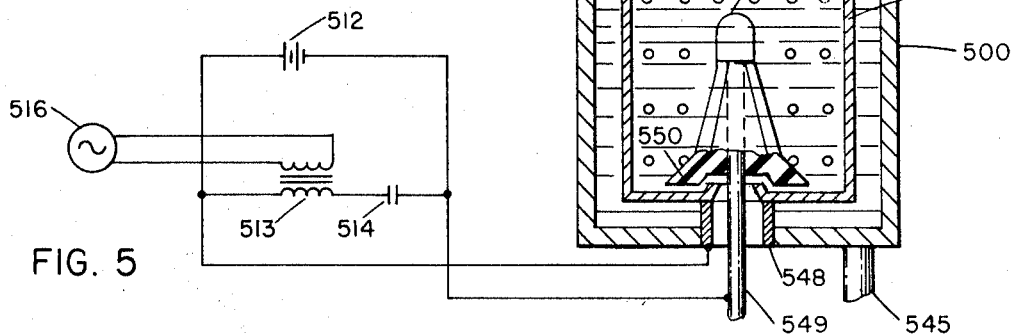
FIG. 5 is a view similar to FIG. 4 of an upright clothes-washing machine in accordance with the invention.

In FIG. 5 I show a clothes-washing machine whose outer casing 500 is adapted to retain liquid at least temporarily prior to discharging it through outlet 545. A rotatable basket 510' again constitutes one electrode of the present system and is mounted upon a tubular shaft 548 for centrifugal extraction of water from the cloth articles. The counterelectrode 510 is formed as a portion of an oscillating agitator 550 composed of rubber or other insulating material, a shaft 549 passing through the agitator 550 into contact with electrode 510. A battery 512 is connected across the electrodes while a high-frequency alternating current source 516 energizes a transformer 513 which, via condenser 514, superimposes the high-frequency wave upon the direct current. A source of fluoride ion is fed from hopper 503 into the inlet-water stream supplied to the machine by pipe 544.

Figure 6:
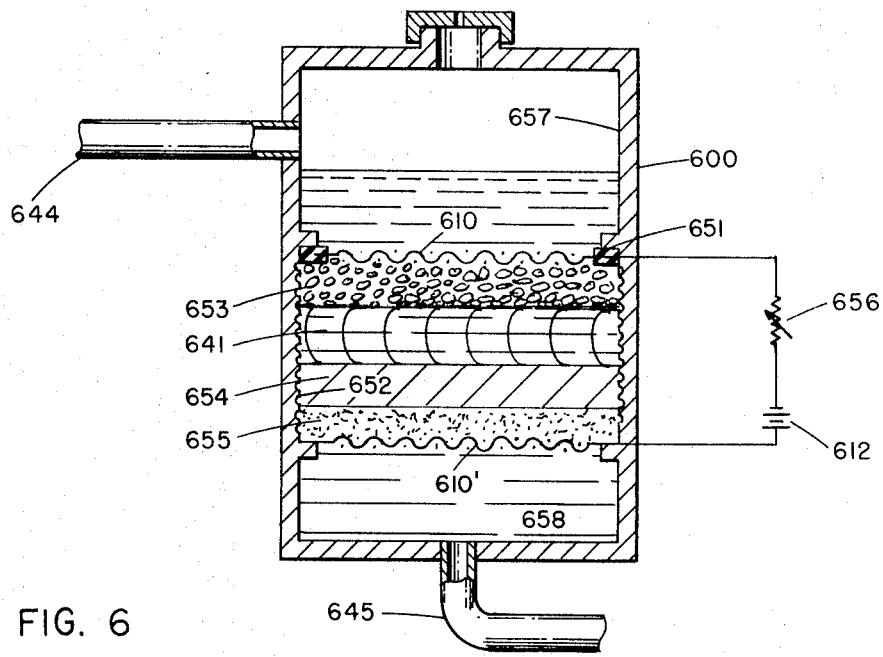
FIG. 6 is an axial cross-sectional view of a home water-treatment device incorporating the present method.

The household water purifier shown in FIG. 6 can comprise a tank having a coverable upper access opening through which the filter and ion-exchange substances can be replaced. An inlet 644 introduces the water into a compartment 657 of the treatment vessel 600 while an outlet 645 removes the treated liquid from chamber 658. A screen 610 is provided between chamber 657 and an intermediate chamber 652 whose walls are corrugated or provided with a succession of annular grooves to prevent laminar flow of liquid around the treating materials retained in this compartment 652. Another screen 610' at the other end of compartment 652 serves to retain the treating materials within the compartment.

The charge of the purifier chamber intermediate the electrode screens 610 and 610' may comprise a coarse filter 653, formed by a mass of crushed stone and the like, adapted to remove large-size impurities and, to a certain extent, absorb those organic contaminants which tend to accumulate upon the large surface areas presented thereby. A porous bag or the like filled with a fluoride-releasing agent of relatively low solubility is dispersed below the coarse filter 653 in a stratum identified as 641. The fluoride ion tends to diffuse throughout the volume intermediate the electrodes 610, 610' and is released gradually into the solution so that its concentration in the latter remains at approximately 0.0005%. Below the fluoride body 641 is disposed a permeable mass 654 within which the retarded flow of liquid undergoes treatment in the electric field with sedimentation of some of the organic contaminants. A highly absorbent layer 655 of activated charcoal or the like serves as the final treatment media, this layer removing absorbable substances from solution. The mass 654 may be a body of an ion-exchange resin adapted to remove calcium and fluoride ions from solution and thus decrease the hardness of the treated liquid. A battery 612 is connected in series with a variable resistor 656 across the electrodes 610, 610', the former being insulated from the casing 600 by a ring 651.

Figure 7:
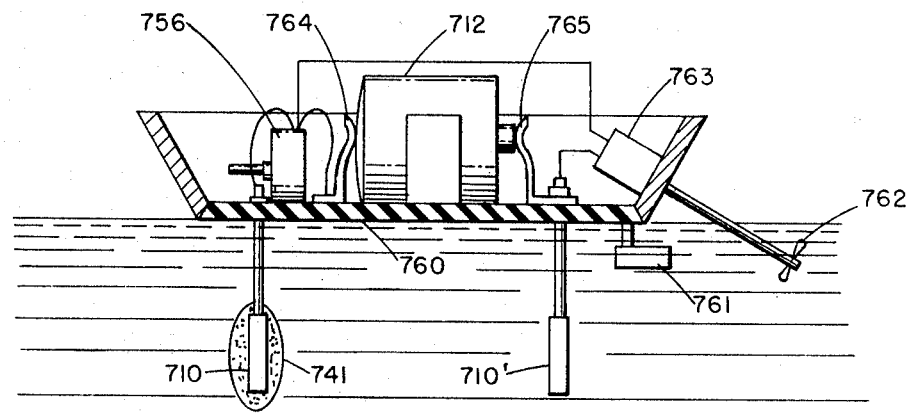
FIG. 7 is a cross-sectional view, partly in elevation, of an apparatus for treating stationary bodies of water such as those of swimming pools.

In FIG. 7 I show a device for the treatment of relatively large stationary bodies of water such as are found in ponds, swimming pools and the like. To avoid the need for electrodes having large surface areas and considerable interelectrode spacing in the treatment of large bodies of water, I prefer to employ a system wherein the electrodes can migrate to different portions of the body and thus distribute the purifying effect substantially throughout the body of liquid. In this case, a floating vessel 760 can be provided to support a battery 712, which may be rechargeable or of the dry-cell type, and a potentiometer 756 in series with the battery 712. The floating support carries a pair of depending electrodes 710, 710' in series with the battery and the potentiometer but insulated from one another by the nonconductive support 760. A permeable bag 741 filled with a fluoride-releasing agent such as calcium fluoride surrounds electrode 710. The device can be positioned in a swimming pool, pond, public bath or the like and permitted to migrate in accordance with the natural currents present in these bodies of water or provided with a motor 763 energized by battery 712 via the terminals 764, 765 yieldably bearing thereon. Motor 763 carries a blade 762 which displaces the support 760 along the surface of the liquid, a rudder 761 being provided to ensure the travel of the device in any predetermined direction (e.g. a circle).

Figure 8:
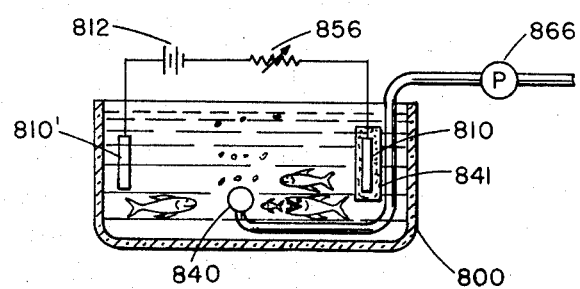
FIG. 8 is a cross-sectional view illustrating the application of the present technique to a fish tank wherein the water sustains living organisms.

In FIG. 8 I show a system for sustaining living organisms, dependent upon a body of water, using the method described above. The fish tank 800 of this system houses a static body of water in which are disposed electrodes 810 and 810'. Electrode 810 is formed by pressing a mass of calcium fluoride with a suitable binder (e.g. plaster of Paris) around a metal plate to form an electrode disk to which a porous layer 841 of the fluoride-releasing agent is firmly bonded. A battery 812 and a voltage-control potentiometer 856 are connected across the electrodes 810, 810' so that, at the cathode 810, fluoride ion is released into solution from the mass 841. An aerating element 840 is provided on the base of the tank to release oxygen into the water in order to replace oxygen depleted therefrom by the fish. Air pump 866 supplies element 840.

Figure 9:
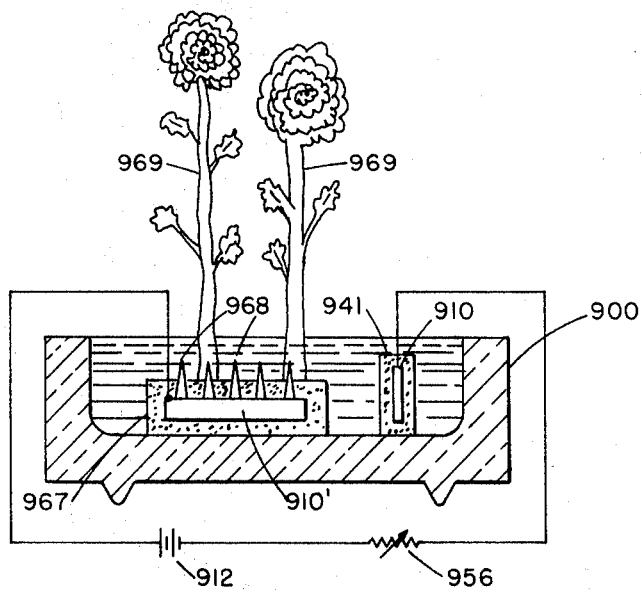
FIG. 9 is a cross-sectional view illustrating a further embodiment of the invention.

In FIG. 9 I show a system for maintaining the freshness of cut flowers for a prolonged period. The flowers 969 are mounted upon molybdenum spikes 968 integral with an electrode body 910' surrounded by a porous foamed synthetic resin 967. The counterelectrode 910 is formed with a mass of a fluoride-releasing material 941 in the manner described with reference to FIG. 8 (these electrodes being immersed within the liquid of the floral-display bowl 900). A battery 912 in series with potentiometer 956 is connected across the electrodes 910, 910'.

EXAMPLE I

The water of a water-supply system is treated in an apparatus of the type shown in FIGS. 1 or 2 at a rate of 0.5 ton/sec. The water, which has a pH of 7, is found to release hydrogen sulfide and ammonia upon boiling and, prior to treatment, has a hardness of 113 parts per million with a COD-solids content of 20 parts per million. The current supplied across the electrodes 110, 110' has a mean intensity of 0.5 amp at 20 volts bridged across these electrodes. A concentration of 0.0005% calcium fluoride was added to the water stream prior to treatment and the resulting product, which passed through the processing vessel in 10 minutes, gave no odor upon boiling. The relative clarity of the water was improved by the treatment, the clarity being measured by conventional light-transmissivity and other standard tests. The COD-solids content of the effluent was found to be 12 parts per million while the hardness was 80 parts per million. Identical results were obtained when a porous bag containing the calcium fluoride surrounded the electrode 110 which was constituted as the cathode during most of the treatment process. When the process was carried out in the plant of FIG. 2, a potential of 20 volts was applied across the first set of electrodes 210a, a potential of 10 volts across electrodes 210b and a potential of 5 volts across electrodes 210c. A 20% saving in power resulted and the process could be carried out automatically.

When a high-frequency alternating current was superimposed upon the direct current of the device of FIGS. 1 and 2, the same direct current voltage and power was able to treat 2 tons of the contaminated water per second to yield water free from organic matter decomposable by boiling to hydrogen sulfite and ammonia. Again the effluent had a hardness of 80 parts per million, a relative clarity of 20 and a COD-solids contents of 12 parts per million. The superimposed alternating current had a frequency of 80 kc./sec. and an intensity of 10 volts (peak to peak) 0.3 amp of a high-frequency alternating current was passed between the electrodes. Sodium fluosilicate and sodium fluoride were also used to produce a fluoride concentration of 0.0005% with equally effective results.

EXAMPLE II

In the fish tank 800 of FIG. 8, which contained 1 liter of water and 10 goldfish about 4 cm. long, the relative clarity of the organically contaminated water, in which the waste eliminations of the fish were suspended or dissolved, was improved from 5 to 12 in a period of 4 hours and from 5 to 20 in a period of 20 hours when 20 gr. of calcium fluoride was disposed at the cathode 810. Both electrodes were composed of molybdenum and had a length of 50 mm. and a diameter of 3 mm., being substantially rod-shaped. A current of 4 milliamps was used when a 9-volt battery was bridged across the electrodes.

EXAMPLE III

A flower vase 900 (FIG. 9), having a liquid capacity of 200 cc., was provided with cut chrysanthemums and maintained a temperature of 23° C. while 0.1 gr. of calcium fluoride was supplied to the liquid within the vase. When no current was passed between the molybdenum electrodes, the chrysanthemums decayed in a week. When, however, a current of 200 microamps was supplied at a voltage of 9 volts for 30 minutes every second day, the chysanthemums remained fresh for at least 3 weeks. The spikes of the flower support were constituted as part of the electrode system and composed of molybdenum.

EXAMPLE IV

A swimming pool having noticeable opacity as a consequence of organic contamination was provided with a device of the type shown in FIG. 7, wherein the electrodes were spaced apart by 10 cm. and a voltage of 4.5 volts was supplied by battery 712. The resistor 756 had a maximum setting of 10,000 ohms and a current of 0.1 amp passed between the molybdenum electrodes, the cathode of which was encased in a permeable bag containing sodium fluosilicate. Water was treated in this manner at a rate of approximately 0.25 ton for each 10 minutes of operation. When the entire body of water had been so treated, there was a noticeable improvement in clarity which was maintained although the swimming pool was in constant use. Substantially no scum formation on the surface of the pool was noted during the operation of the device which coincided with the use of the pool.

EXAMPLE V

A moist garden plot sustaining a rose bush was bracketed by a pair of electrodes spaced 10 cm. apart and having a diameter of 3 mm. and a length of 10 cm. The molybdenum electrodes were thrust into the ground, which had standard mineral content including fluoride, and a current of 40–100 microamps supplied at 9 volts. The growth rate of the rose bush showed a marked improvement over that of a control planted in similar soil. Moreover, the flower of the treated bush was of substantially brighter hue.

The invention described and illustrated above is believed to admit of many modifications within the ability of persons skilled in the art, all such modifications being considered within the spirit and scope of the appended claims.

I claim:
1. A method of purifying a continuous stream of water containing organic contaminants comprising the steps of:
 (a) determining the electrical conductivity of said stream at a first location therealong;
 (b) introducing a low-solubility fluoride into said stream at a second location therealong downstream of said first location;
 (c) electrolyzing said stream between a first pair of electrodes downstream of said first location with a direct current of magnitude depending upon the electrical conductivity determined in step (a) while superimposing upon the direct current a high-frequency alternating current;
 (d) electrolyzing said stream between at least one second pair of electrodes downstream of said first pair of electrodes with a direct current while superimposing thereon a high-frequency alternating current; and
 (e) determining the electrical conductivity of said stream at a third location downstream of said second pair of electrodes, and controlling the magnitude of said direct current in step (d) with the determined conductivity at the third location to minimize residual contamination in the stream flowing past said third location.

2. The method defined in claim 1 wherein calcium fluoride is added to said stream at said second location.

3. The method defined in claim 2 wherein said stream is filtered subsequent to electrolysis at said second pair of electrodes and prior to reaching said third location, said method further comprising the step of detecting the current drawn at said second pair of electrodes and controlling the flow rate of said stream in accordance therewith.

4. An apparatus for the continuous purification of a flowing stream of contaminated water, comprising:
 (a) a conductivity cell traversable by said stream at a first location for producing an output signal determined by the electrical conductivity of said stream;
 (b) a first pair of electrodes immersible in said stream downstream of said first location and a second pair of electrodes immersible in said stream downstream from said first pair of electrodes;
 (c) circuit means for independently energizing said pairs of electrodes each with an electrolyzing direct current with superimposed high-frequency alternating current;
 (d) means for introducing a low-solubility fluoride into said stream at a second location downstream of said first location whereby electrolysis at said electrodes is adapted to be carried out in the presence of the low-solubility fluoride;
 (e) first control means responsive to the conductivity of said stream determined at said conductivity cell for controlling the magnitude of the direct current at said first pair of electrodes;
 (d) a further conductivity cell at a third location along said stream and in contact therewith downstream of said second pair of electrodes; and
 (e) second control means responsive to said further conductivity cell for controlling the amplitude of the direct current at said second pair of electrodes to minimize residual contamination in the stream of water flowing past said third location.

5. The apparatus defined in claim 4, further comprising a common chamber receiving said conductivity cells and said electrodes and traversed by said stream, filter means in said chamber downstream of said second pair of electrodes, and means responsive to the current drawn at said second pair of electrodes for controlling the rate of flow of said stream through said chamber.

6. The apparatus defined in claim 5 wherein the first-mentioned conductivity cell includes a direct-current source, a pair of conductivity electrodes spaced apart in said chamber and a saturable reactor in series with said conductivity electrodes and said direct-current source, said circuit means including an alternating-current supply in series with said saturable reactor, rectifier means in series with said saturable reactor and connected to said first pair of electrodes, said further conductivity cell including a pair of conductivity electrodes spaced apart in said chamber, a direct-current source and a further saturable reactor in series therewith, said circuit means also including an alternating-current supply in series with said further saturable reactor and rectifier means in series with said further saturable reactor and connected to said second pair of electrodes.

References Cited

UNITED STATES PATENTS

| 961,924 | 6/1910 | Wohlwill. | |
|---|---|---|---|
| 1,956,411 | 4/1934 | Bonine | 204—149 |
| 2,046,467 | 7/1936 | Krause | 204—149 |
| 2,221,997 | 11/1940 | Polin | 204—196 |
| 2,621,671 | 12/1952 | Eckfeldt | 204—231 |
| 3,067,123 | 12/1962 | Huber | 204—231 |
| 3,208,925 | 9/1965 | Hutchison et al. | 204—196 |
| 3,222,269 | 12/1965 | Stanton | 204—242 |
| 3,248,309 | 4/1966 | Robinson | 204—231 |
| 3,414,497 | 12/1968 | Kanai | 204—149 |

TA-HSUNG TUNG, Primary Examiner

U.S. Cl. X.R.

8—137; 204—231, 275; 210—62